Patented Oct. 18, 1949

2,485,164

UNITED STATES PATENT OFFICE 2,485,164

PROCESS FOR TREATING GYPSUM OBTAINED AS A BY-PRODUCT OF PHOSPHORIC ACID MANUFACTURE

George A. Peirce, Westfield, N. J., assignor to E. I. du Pont de Nemours & Company, Wilmington, Del., a corporation of Delaware No Drawing. Application May 22, 1945, Serial No. 595,251

4 Claims. (Cl. 23—122)

This invention relates to the manufacture of phosphoric acid by the sulfuric acid process and is particularly directed to the recovery of by-product gypsum in a usable form.

In the manufacture of phosphoric acid by the sulfuric acid process, phosphate rock or other source of cheap tricalcium phosphate is leached with sulfuric acid in the course of which phosphoric is freed and calcium sulfate is precipitated. Because of the impurities contained in the calcium sulfate thus formed and especially because of the high content of silica and the high but considerably smaller content of $P_2O_5$, whether as phosphoric acid or insoluble phosphates, there has been no outlet for this by-product gypsum and it has been customary to dispose of it on dumps or otherwise without crediting it to the process.

It is an object of the present invention to recover the gypsum which is by-product to the sulfuric acid process for the manufacture of phosphoric acid as a credit to that process. Another object is to provide for the recovery of by-product gypsum free or substantially free of silica. Another object of the invention is to provide for the recovery of by-product gypsum free or substantially free of $P_2O_5$. Another object of the invention is to recover the by-product gypsum as insoluble anhydrite. Another object of the invention is to recover byproduct gypsum as insoluble anhydrite of such quality as to be useful as a pigment extender for paint. Another object of the invention is to accomplish the aforementioned recoveries in an economical manner. Another object is to avoid the disadvantages of the prior art, and still further objects will appear as the description proceeds.

Phosphoric acid is commonly produced by the digestion of phosphate rock with sulfuric acid. According to one method, the phosphate rock is fully ground and introduced into sulfuric acid of suitable strength whereupon phosphoric acid is freed and calcium sulfate is precipitated as gypsum. According to another method, the phosphate rock is wet-ground in a ball mill with sufficient weak phosphoric acid partially to convert the tricalcium phosphate to an acid phosphate. The product of this milling is then digested with sulfuric acid whereupon phosphoric acid is freed and calcium sulfate is precipitated as gypsum. This type of process is of particular advantage because the weak phosphoric acid produced in washing the gypsum is continually returned to the process (the milling operation) so that a strong acid is easily obtained.

Gypsum produced according to one or the other of these processes is treated in accordance with the present invention to provide a marketable product. Without such a treatment the gypsum may have an objectionable dirty-white color, poor oil absorptivity, grittiness, excessive content of $P_2O_5$ and/or other impurities which singly or combined make the by-product gypsum unsuitable for the customary uses for gypsum.

In accordance with the invention, the by-product gypsum is subjected to attrition in the presence of dilute acid, for example, by digesting it in dilute sulfuric acid in a ball mill or other suitable attrition mill. Through the combined action of attrition and dilute sulfuric acid, objectionable impurities contained in the by-product gypsum are removed and the oil absorptivity of the by-product gypsum substantially increased.

After suitably digesting the by-product gypsum in weak sulfuric acid, it is separated from the spent acid and dried, or partially dried, at a relatively low temperature and then calcined. If the wet gypsum is dried at about 160° C. before digesting with sulfuric acid, or if it is seeded with a small quantity of anhydrite during digestion, the product, when calcined, is insoluble anhydrite of the character generally used in pigments.

When the by-product gypsum is treated according to the invention and calcined at low temperatures, about 550 to 750° C., it sometimes occurs that the product is not as white as desired. According to the invention, it has been found that, if it is calcined at a temperature above about 750° C. but below about 900° C., a product of the desired color may be obtained. It has also been found according to the invention that the difficulty may be avoided by giving the by-product gypsum a pretreatment with water in which the carbonaceous material responsible for the off-color of the low temperature calcined product is floated and removed. By this pretreatment, it is possible to calcine at a temperature below 700° C. and still obtain a suitable white product. It is of advantage to do so since a certain amount of sintering is likely to take place at the higher temperatures which are necessary to burn out the discoloring carbonaceous material.

According to the invention, still further improvement in the quality of the product may be obtained by effecting complete or partial separation of silica prior to the digestion. By subjecting the by-product gypsum to classification and/or flotation, it is possible to effect separation of silica. By suitable flotation technique using suitable flotation agents, the gypsum may be floated substantially free of the silica.

Alternatively, the silica may be separated by digesting the phosphate rock with sufficient sulfuric acid to convert the tricalcium phosphate to mono calcium phosphate, filtering off the undissolved rock, and adding thereafter the requisite sulfuric acid to precipitate the gypsum. This latter process is particularly applicable to the wet milling process (Heckenbleikner 1,667,459), in which the phosphate rock is milled in weak phosphoric acid. In such cases, the product of the milling is filtered or otherwise treated to remove the undissolved rock prior to treatment with sulfuric acid.

The invention may be more fully understood by reference to the following examples in which the parts are by weight unless otherwise specified.

*Example I*

A by-product gypsum analyzed on a dry basis 1.08 $P_2O_5$, 6.92 $SiO_2$, and 0.272 fluorine with small amounts of iron and aluminum was dried at 160° C. 159 parts of the dried material was mixed with 400 parts of 15% sulfuric acid solution. The mixture was preheated and introduced into a ball mill and digested for six hours at 93° C. The spent acid was filtered off and the filter cake washed with water until acid-free to litmus. The filter cake was dried for 5 hours at 100° C. giving 160 parts of slightly damp product. 100 parts of this material were calcined in an electric muffle for 2 hours at 750° C., giving 97 parts of insoluble calcium sulfate anhydrite. The material obtained was very white and had high oil absorptivity. When mixed with 30% $TiO_2$ it gave an extended pigment of excellent color and strength.

*Example II*

The by-product gypsum, as in Example I, was wet-screened through a 100-mesh screen and ball-milled for 24 hours at a temperature of 99° C. in 15% sulfuric acid solution in the proportions of 120 parts of dry residue to 400 parts of solution. The spent acid was filtered off and the filter cake washed with water until acid-free litmus, and then dried and calcined as in Example I. The material so obtained was considerably more fluffy than that of Example I and had slightly better color and its strength and oil absorption were high.

*Example III*

A further quantity of by-product gypsum of the above analysis was digested in a ball mill in 15% sulfuric acid solution for 24 hours at 99° C. in the proportions of 198 parts of wet gypsum (containing 120 parts of dry residue) to 400 parts of sulfuric acid. The spent acid was filtered off and the filter cake was washed with water until acid-free to litmus and without drying the wet cake was calcined for 2 hours at 750° C. There was obtained a floury calcium sulfate of poor color and poor strength.

*Example IV*

The process of Example III was repeated with this exception that the by-product gypsum was dried for 16 hours at 160° C. before digesting in the ball mill with sulfuric acid. The product has good color and strength, being comparable to that obtained by Example I.

*Example V*

To 500 parts of 15% sulfuric acid solution heated to 95° C. were added 75 parts of wet by-product gypsum (containing 50 parts of dry residue) as described in Example I and 13.7 parts of calcium sulfate anhydrite slurry (containing 1 part $CaSO_4$) obtained by reacting 8.5 parts of hydrated lime with 207 parts of 60° Baumé sulfuric acid below 35° C. There was then added an additional 75 parts of wet by-product gypsum (containing 50 more parts of dry residue). The slurry was then introduced into a ball mill and digested for 6 hours at a temperature of 99° C. It was then filtered and washed until acid-free to litmus and the cake dried and calcined for 2 hours at 750° C. The product had good color and strength and high oil absorptivity, being better in these respects than products of Examples I and IV.

*Example VI*

By-product gypsum, as in Example I, was subjected to flotation with oleic acid as the collecting agent and the concentrate, substantially freed of silica, was digested in a ball mill in 15% sulfuric acid solution as described in Example V.

To 500 parts of 15% sulfuric acid solution heated to 90–95° C. were added 50 parts of dry concentrate from the flotation of by-product gypsum and 1 part of calcium sulfate anhydrite in 12.7 parts of sulfuric acid slurry obtained as described in Example V. An additional 50 parts of dry concentrate was added and the slurry digested for two hours at 95–100° C. The slurry was then introduced into a ball mill and digested for four hours at 99° C. It was then filtered, washed, dried, and calcined for two hours at 750° C. The product was excellent in pigment properties, having good color and strength and high oil absorption. It contained only 0.5% silica.

I have described my invention with reference to particular embodiments therefor. It will be understood that variations will be made therein without departing from the spirit and scope of the invention.

The concentration of the sulfuric acid may vary widely in accordance with well-known principles of converting calcium sulfate to anhydrite. Suitably, concentrations ranging from 5–25% may be employed. The temperature may be varied widely and is dependent to some extent upon the concentration of the sulfuric acid; lower concentrations requiring the higher temperatures. Suitably, the temperature may range from 90–105° C.

In place of sulfuric acid there may be substituted other strong mineral acids, such as hydrochloric acid.

In place of seeding with anhydrite crystals obtained from lime and 60° Baumé sulfuric acid as set out in Example V; the seed crystals may be obtained from any suitable source as, for example, by recirculation in the process itself from one operation to another. While it is possible to effect conversion of the by-product gypsum to anhydrite by seeding, it is, nevertheless, more desirable to dry the by-product gypsum prior to digestion in dilute sulfuric acid. It appears necessary to heat over a considerable period in order to convert or initiate conversion to anhydrite. While no hard and fast rules can be laid down covering the drying, since both time and temperature are involved, it will generally be suitable if the wet residue is dried at a temperature between 140 and 180° C.

The calcination is preferably carried out at temperatures between 700 and 800° C. At lower temperatures the time required for calcination may be undesirably prolonged, whereas at higher temperatures some sintering may result. Generally it is not desirable to calcine at temperatures higher than about 900° C.

The proportions of acid to by-product gypsum may be varied as required to maintain a slurry of suitable fluidity for the attrition without excessive waste of sulfuric acid. It will generally be suitable if the total quantity of acid is from 3 to 6 times the total quantity of by-product gypsum.

I claim:

1. A process for treating gypsum obtained as a by-product of phosphoric acid manufacture by the sulfuric acid process to remove objectionable impurities and increase oil absorptivity of the by-product, comprising the steps of subjecting the by-product gypsum to attrition in the presence of 3 to 6 parts by weight of 5 to 25 per cent aqueous sulfuric acid for each part by weight of by-product gypsum, separating the aqueous acid solution, drying the remaining solid at a temperature of 90 to 110° C., and calcining the solid at a temperature of 600 to 900° C.

2. A process for treating gypsum obtained as a by-product of phosphoric acid manufacture by the sulfuric acid process to remove objectionable impurities, increase oil absorptivity and provide a pigment useful insoluble anhydrite, comprising the steps of subjecting the by-product gypsum to attrition in the presence of a small amount of insoluble anhydrite and from 3 to 6 parts by weight of 5 to 25 per cent aqueous sulfuric acid for each part by weight of by-product gypsum, separating the aqueous acid solution, drying the remaining solid at a temperature of 90 to 100° C., and calcining it at a temperature of 600 to 900° C.

3. A process for treating gypsum obtained as a by-product of phosphoric acid manufacture by the sulfuric acid process to remove objectionable impurities, increase oil absorptivity and provide a pigment useful insoluble anhydrite, comprising the steps of slurrying the by-product gypsum in water, removing the material which floats to the surface of the slurry, separating the by-product gypsum from the water, subjecting the by-product gypsum to attrition in the presence of a small amount of insoluble anhydrite and from 3 to 6 parts by weight of 5 to 25 per cent aqueous sulfuric acid for each part by weight of by-product gypsum, separating the aqueous acid solution, drying the remaining solid at a temperature of 90 to 100° C., and calcining it at a temperature of 600 to 900° C.

4. A process for treating gypsum obtained as a by-product of phosphoric acid manufacture by the sulfuric acid process to remove objectionable impurities, increase oil absorptivity and provide a pigment useful insoluble anhydrite, comprising the steps of drying the by-product gypsum at a temperature between 140 and 180° C., subjecting the by-product gypsum to attrition in the presence of from 3 to 6 parts by weight of 5 to 25 per cent aqueous sulfuric acid for each part by weight of by-product gypsum, separating the aqueous acid solution, drying the remaining solid at a temperature of 90 to 100° C., and calcining it at a temperature of 600 to 900° C.

GEORGE A. PEIRCE.

REFERENCES CITED

The following references are of record in the file of this patent:

UNITED STATES PATENTS

| Number | Name | Date |
| --- | --- | --- |
| 1,392,574 | Emley | Oct. 4, 1921 |
| 2,006,342 | Booge | July 2, 1935 |
| 2,021,671 | Skinner | Nov. 19, 1935 |
| 2,151,331 | Roberts | Mar. 21, 1939 |

FOREIGN PATENTS

| Number | Country | Date |
| --- | --- | --- |
| 457,552 | Great Britain | Nov. 25, 1936 |